Sept. 4, 1945.  D. L. JOCELYN  2,384,381
AIRCRAFT ENGINE
Filed Jan. 2, 1943
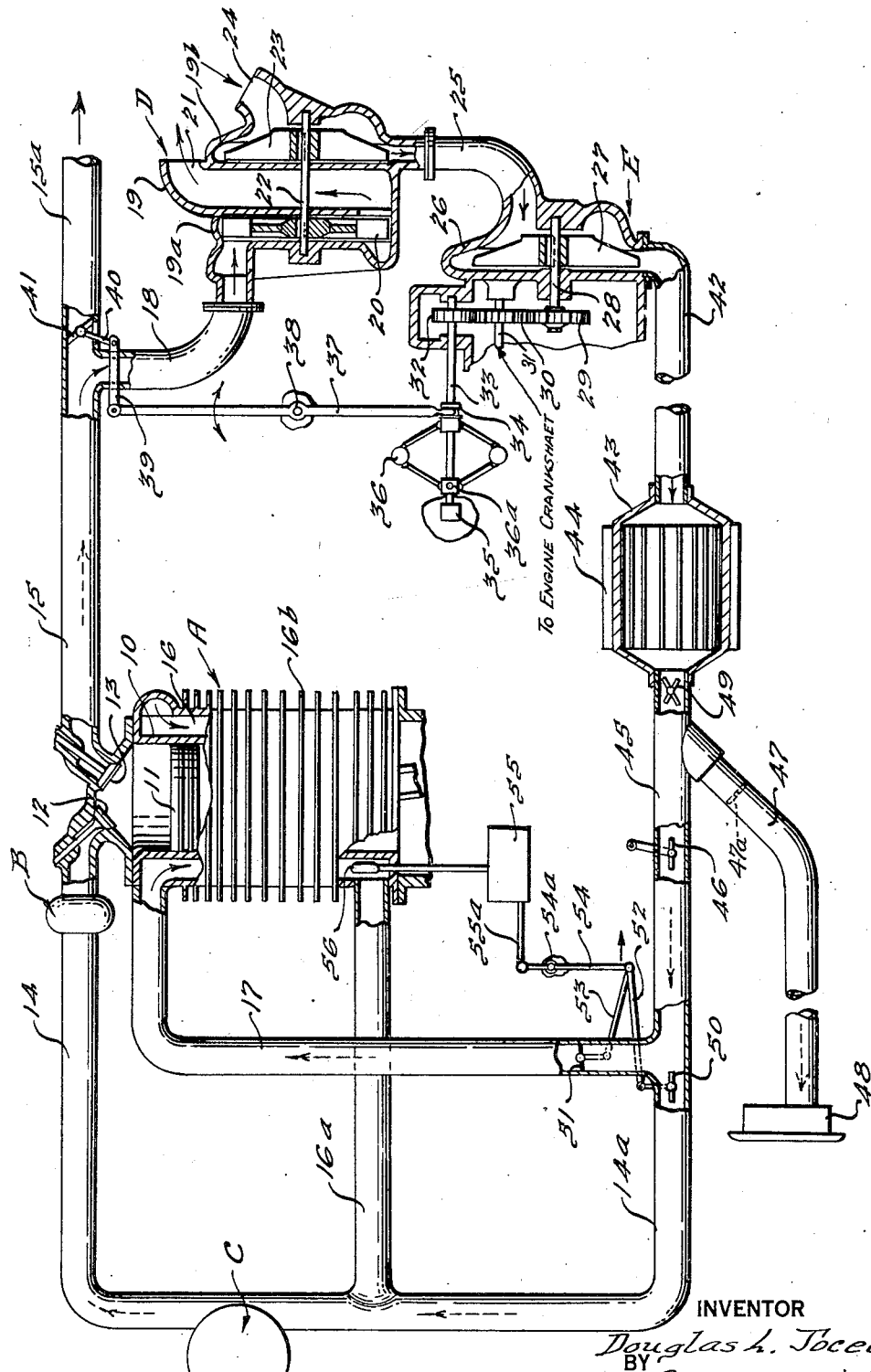
INVENTOR
Douglas L. Jocelyn.
BY
Gray & Smith
ATTORNEYS.

Patented Sept. 4, 1945

2,384,381

UNITED STATES PATENT OFFICE 2,384,381

AIRCRAFT ENGINE

Douglas L. Jocelyn, Detroit, Mich., assignor of fifty per cent to Dorothy G. Jocelyn, Detroit, Mich.

Application January 2, 1943, Serial No. 471,154

12 Claims. (Cl. 123—119)

This invention relates to internal combustion engines and particularly although not exclusively to engines or power plants for aircraft.

An object of the present invention is to provide a power plant having means for delivering supercharged air either to the intake manifold of the engine or to a cooling jacket surrounding the cylinder or to both, whereby at certain periods the cooling of the engine may be supplemented while at all times the supercharged air, or any portion thereof, may be delivered to the carburetor or other fuel mixture system for delivery to the engine combustion chambers.

A further object of the invention is to provide an engine cooling system in which air, preferably cooled, may be directed to the engine for cooling purposes and thence delivered to the intake of the engine for combustion purposes.

Still another object of the invention is to provide a power plant in which air, preferably from a supercharger, may be chilled and thence delivered to the engine for cooling the same at predetermined times.

Another object of the invention is to provide means for directing the air, after serving its engine cooling purposes, to the intake of the engine for combustion purposes.

A further object of the invention is to provide a combined engine cooling and combustion system in which the air delivered to the carburetor or other mixing device or to the intake of the engine is first utilized for assisting in cooling the engine.

A still further object of the invention is to provide means for cooling the air from the supercharger and delivering this air by way of an engine cooling system to the intake of the engine.

Another object of the invention is to provide means for delivering air to an engine cooling jacket in such quantities as may be needed for cooling purposes and wherein thermostatically-operated means controlled by the temperature of the engine is provided for varying the quantity of air delivered to the jacket.

Other objects of this invention will appear in the following description and appended claims, reference being had to the accompanying drawing forming a part of this specification wherein like reference characters designate corresponding parts in the view.

The figure of the drawing is in part a diagramatic view illustrating the power plant and the various associated mechanisms for accomplishing the purposes and objects of the present invention.

Before explaining in detail the present invention it is to be understood that the invention is not limited in its application to the details of construction and arrangements of parts illustrated in the accompanying drawing, since the invention is capable of other embodiments and of being practiced or carried out in various ways. Also it is to be understood that the phraseology or terminology employed herein is for the purpose of description and not of limitation.

In the drawing there is illustrated, by way of example, a suitable power plant having means for directing supercharged air either to the intake manifold of the engine or to a cooling jacket surrounding the cylinder, or to both. The present power plant mechanism is particularly desirable for use in connection with aircraft, although it will be understood that it is applicable to various vehicles propelled with the aid of internal combustion engines, such for instance as automobiles and the like.

In general the present power plant mechanism comprises an internal combustion engine A having a suitable intake manifold B to which the fuel mixture is conveyed from a carburetor C. Supercharged air is supplied directly to the engine or to the carburetor, or to both, by means of an exhaust-driven supercharger D. This supercharger may be supplemented in the event the power of the engine falls off, such as at high altitudes, by means of a mechanically-driven supercharger E which is connected in series with the exhaust-driven supercharger. The mechanism embodying the present invention also includes a storage chamber by which the supercharged air may be cooled before directing the same to cooling jackets surrounding the engine cylinders and from these jackets the air is directed to the carburetor C where it is mixed with the fuel. Although the present power plant is illustrated as being provided with a carburetor, it will be understood that the fuel mixture or the fuel charge may be supplied to the engine cylinders by means of any suitable fuel injection system.

The internal combustion engine A comprises any suitable number of engine cylinders, one such cylinder 10 being illustrated in the present instance for the purpose of simplification. Within each cylinder 10 is a reciprocable piston 11. Also each cylinder is provided with an intake valve 12 and an exhaust valve 13 which may be of the conventional poppet type. The fuel mixture is conducted from the carburetor C to the intake manifold B and thence to the intake valves 12 by means of an intake conduit 14. The products of combustion are exhausted from the engine cylinders past the exhaust valves 13 by means of an exhaust conduit 15, this conduit communicating with any suitable exhaust manifold.

Surrounding each of the cylinders 10 is a cooling jacket or chamber 16 and the outer wall of each of these jackets may be provided with suitable cooling fins 16b. Leading into the cooling jacket 16 of the cylinder is a by-pass air conduit 17, this conduit entering the top of the jacket. Leading from the lower end of this jacket is a return air conduit 16a which communicates with the intake conduit 14a at the engine side of the carburetor C.

The exhaust gases passing through the exhaust conduit 15 may be by-passed into a by-pass exhaust conduit 18 and thence conducted to the exhaust-driven supercharger D. This supercharger comprises a casing 19 formed with a ring 19a within which is located a turbine wheel or rotor 20. The casing is provided with an outlet passage 21 for the exhaust which communicated with the ring 19a. The turbine or rotor 20 is keyed to a shaft 22 extending through the chamber 21 and to the outer end of which is keyed an impeller 23 located within an annular chamber 19b forming a part of the casing 19. Communicating with the chamber 19b is an air intake 24 and communicating with the lower end of this chamber is an air outlet conduit 25 which in turn leads into an annular chamber 26 within which is located the mechanically-driven impeller 27 of the supercharger E.

The mechanically-driven impeller 27 is keyed to the inner end of a shaft 28. Secured to the outer end of this shaft is a gear 29 meshing with a gear 30 secured to a shaft 31 driven through suitable mechanism from the crankshaft of the engine. The gear 30 meshes with a gear 32 secured to a governor shaft 33. On this shaft is slidingly mounted a sleeve 34 which is splined to the shaft. 35 is a bearing for the outer end of the governor shaft. Between the shaft and sleeve 34 is mounted a suitable fly ball governor 36. The outer links of this fly ball governor are pivotally mounted in fixed position at 36a to the governor shaft and the inner links are pivotally connected to the sleeve 34. The sleeve 34 is grooved to receive the bifurcated end of a governor-operated lever 37 pivoted at 38 to a suitable support and having its outer end pivoted to a link 39. This link is pivotally connected to a lever 40 which in turn is secured to the shaft of a butterfly valve or waste gate 41 mounted within the exhaust conduit 15 beyond the by-pass exhaust conduit 18 so as to variably control the amount of exhaust gases which are allowed to escape to the atmosphere through the extension 15a or are forced to pass through conduit 18 and drive the turbine rotor 20.

The air conduit 25 communicates with the center of the chamber 26 of the mechanically-driven supercharger E. Leading from the lower end of this chamber is an outlet air conduit 42 which conducts the supercharged air to a suitable storage chamber 43. The storage chamber 43 is provided with means such as external and internal fins 44 for removing the heat of compression from the compressed air in the chamber 43. This chamber is shown diagrammatically. However, it will be understood that it may be of considerable area and may be located in the airplane or other vehicle in such manner that considerable areas of the chamber are exposed to the outside air and to its hard rubbing and cooling action. Leading from the outlet side of the chamber 43 is an air conduit 45 within which is located a suitable control valve 46 of the throttle type. If it is desirable, some of the cooled air may be by-passed through a conduit 47 to any suitable air conditioning device 48 mounted within the compartment of the airplane or vehicle.

At the outlet side of the chamber 43 and within the conduit 45 is a suitable expansion valve or throttle valve 49. It will be seen that the by-pass conduit 17 communicates with an extension 14a of the intake conduit 14 which in turn forms a continuation of the conduit 45. At the carburetor side of the juncture between conduits 17 and 14a is mounted a control valve 50 of the throttle type. Also mounted within the by-pass conduit 17 is a control valve 51 also of the throttle type. These valves 50 and 51 are interconnected through the medium of links 52 and 53 respectively, and these links are operated in unison through the medium of a lever 54 pivoted at 54a to a suitable support. The lever 54 is swung in one direction or the other by means of a push and pull rod 55a controlled by a thermostatically operated device 55 which is influenced by means of a thermostatic element 56 extending within the cooling jacket 16, preferably adjacent the conduit 16a.

The control valves 50 and 51 are operated in unison so that when one opens the other closes. The thermostatic device 55, 56 functions in such manner that as the temperature of the engine rises, thus influencing element 56, plunger 55a is shifted to actuate lever 54 in a direction to move or rotate valve 51 toward open position and valve 50 toward closed position. This action permits increased flow of cooling air through pipe 17 into the jacket 16. The reverse action occurs as the temperature of the engine drops. It will be seen, however, that whether the air from the superchargers directed through pipe 45 is partly or wholly by-passed through pipe 17 to the cooling jackets 16 of the engine, all of this air passes thence through pipe 16a to the carburetor. Hence, the carburetor is adequately supplied with air and all of the air directed through pipe 45 for combustion purposes is conducted to the carburetor either through pipes 14a and 17 conjointly or wholly through one or the other, depending upon the temperature of the engine, its effect on the thermostatic device 55, 56, and the positions of valves 50 and 51.

Normally, the engine is supplied with supercharged air from the mechanically-driven supercharger E, particularly at or near ground levels. In the event, during operation of the airplane, a drop in power occurs, the mechanical supercharger is supplemented by the exhaust-driven supercharger D. This is accomplished by the governor 36 and valve 41. Since the speed of rotation of shaft 31 is directly related to the speed of rotation of the engine crankshaft, any drop in power will result in a decrease in the speed of rotation of shaft 31 and consequently in governor shaft 33. When this occurs the fly balls of the governor will approach the governor shaft, thereby shifting sleeve 34 to the right and hence through lever and link mechanisms 37, 39 and 40 moving valve 41 toward closed position. In the drawing, valve 41 is in its fully closed position thereby diverting all of the exhaust gases to the turbine rotor 20. An increase in engine speed beyond the set speed will result in fly balls 36 moving outwardly by centrifugal action resulting in shifting sleeve 34 to the left and causing pivotal movement of valve 41 toward its open position.

It will be understood that impellers 23 and 27 function to draw air through air intake 24 and discharge it through pipe 42. The supercharged air from this pipe may be directed to the compression chamber 43 and thence to the intake conduit extension 45 or, where the expansion chamber is dispensed with, the air may be conducted directly from pipe 42 to pipe 45.

I claim:

1. In an internal combustion engine, a cylinder having a reciprocable piston and a cooling jacket surrounding the cylinder, an air intake conduit leading to the combustion chamber of the cylinder, a second air intake conduit communicating with said first conduit and leading to said jacket, valve means for diverting air from said first conduit into the second conduit and thence to said jacket to cool the cylinder, and a third conduit for conducting the air from said jacket to the cylinder combustion chamber.

2. In an internal combustion engine, a cylinder having an air intake, a cooling jacket associated with the cylinder, an air conduit leading to said intake, a by-pass conduit leading from said first conduit to said jacket, a return air conduit leading from said jacket to said first conduit, and thermostatically-operated valve means for controlling the flow of air through said first conduit and said by-pass conduit.

3. In an internal combustion engine, a cylinder having an air intake, a cooling jacket associated with the cylinder, an air-storage chamber, a supercharger for delivering air thereto, means for conducting air selectively from said chamber to said cooling jacket and to said air intake, and means for conducting the air from said jacket to said intake.

4. In an internal combustion engine, a cylinder having an air intake, a cooling jacket associated with the cylinder, an air-storage chamber, a supercharger for delivering air thereto, means for conducting air selectively from said chamber to said cooling jacket and to said air intake, means for conducting the air from said jacket to said intake, and thermostatic means influenced by the temperature in said jacket for controlling the flow of air to said cooling jacket.

5. In an internal combustion engine, a cylinder having a reciprocable piston and a cooling jacket surrounding the cylinder, an air intake conduit leading to the combustion chamber of the cylinder, a carburetor interposed in said conduit, a second air intake conduit communicating with said first conduit and leading to said jacket, valve means for diverting air from said first conduit into the second conduit and thence to said jacket to cool the cylinder, and a third conduit for conducting air from said jacket to said air intake conduit in advance of said carburetor.

6. In an internal combustion engine, a cylinder having a reciprocable piston and a cooling jacket surrounding the cylinder, an air intake conduit leading to the combustion chamber of the cylinder, a second air intake conduit communicating with said first conduit and leading to said jacket, valve means controlled by the temperature in said jacket for diverting air from said first conduit into the second conduit and thence to said jacket to cool the cylinder, and a third conduit for conducting the air from said jacket to the cylinder combustion chamber.

7. In an internal combustion engine, a cylinder having an air intake, a heat exchange jacket associated with the cylinder, an air intake conduit leading to said air intake, a supercharger for delivering air to said conduit, means for conducting air selectively from said conduit to said jacket and to said air intake, and means for conducting air from said jacket to said intake.

8. In an internal combustion engine, a cylinder having an air intake, a heat exchange jacket associated with the cylinder, an air intake conduit leading to said air intake, a supercharger for delivering air to said conduit, means for conducting air selectively from said conduit to said jacket and to said air intake, and thermostatically controlled means for conducting air from said jacket to said intake.

9. In an internal combustion engine, a cylinder having an air intake, a heat exchange jacket associated with the cylinder, an air intake conduit leading to said air intake, a supercharger for delivering air to said conduit, means for conducting air selectively from said conduit to said jacket and to said air intake, and means controlled by the temperature in said jacket for conducting air from said jacket to said intake.

10. In an internal combustion engine, a cylinder having an air intake, a heat exchange jacket associated with the cylinder, an air intake conduit leading to said air intake, a supercharger for delivering air to said conduit, means for conducting air selectively from said conduit to said jacket and to said air intake, and thermostatically controlled means influenced by the temperature in said jacket for conducting air from the jacket to said intake conduit.

11. In an internal combustion engine, a cylinder having an air intake, a heat exchange jacket associated with the cylinder, an air conduit leading to said intake, a by-pass conduit leading from said first conduit to said jacket, a return air conduit leading from said jacket to said first conduit, and valve means for controlling the flow of air through said first conduit and said by-pass conduit.

12. In an internal combustion engine, a cylinder having a reciprocable piston and a heat exchange jacket associated with the cylinder, an air intake conduit leading to the combustion chamber of the cylinder, a second air intake conduit communicating with said first conduit and leading to said jacket, valve means for diverting air from said first conduit into the second conduit and thence to said jacket, and a third conduit for conducting the air from said jacket to the cylinder combustion chamber.

DOUGLAS L. JOCELYN.